United States Patent [19]

Igarashi

[11] Patent Number: 5,740,462

[45] Date of Patent: Apr. 14, 1998

[54] OUTPUT APPARATUS PERMITTING FONT SELECTION BASED ON RESOLUTIONS

[75] Inventor: Masaru Igarashi, Yokohama, Japan

[73] Assignee: Canon Kabushiki Kaisha, Japan

[21] Appl. No.: 396,903

[22] Filed: Mar. 1, 1995

Related U.S. Application Data

[63] Continuation of Ser. No. 116,543, Sep. 7, 1993, abandoned, which is a continuation of Ser. No. 598,154, Oct. 16, 1990, abandoned.

[30] Foreign Application Priority Data

Oct. 23, 1989 [JP] Japan .................................. 1-273838

[51] Int. Cl.⁶ .................................................. G06F 17/21
[52] U.S. Cl. ................................... 395/805; 345/472
[58] Field of Search ............................ 395/110, 150, 395/151, 805, 171, 172; 358/296, 300; 345/128, 129, 130, 143

[56] References Cited

U.S. PATENT DOCUMENTS

| | | | |
|---|---|---|---|
| 4,594,674 | 6/1986 | Boulia et al. | 395/171 |
| 4,786,920 | 11/1988 | Igarashi | 346/134 |
| 4,814,892 | 3/1989 | Igarashi | 358/296 |
| 4,827,358 | 5/1989 | Matsumoto | 358/296 |
| 4,907,282 | 3/1990 | Daly et al. | 345/128 X |
| 4,953,033 | 8/1990 | Sakamoto | 358/300 |
| 5,020,004 | 5/1991 | Igarashi | 364/519 |
| 5,045,869 | 9/1991 | Isaka et al. | 358/296 X |
| 5,045,967 | 9/1991 | Igarashi | 364/518 |
| 5,081,594 | 1/1992 | Horsley | 395/150 |
| 5,319,358 | 6/1994 | Martwez et al. | 395/151 X |

FOREIGN PATENT DOCUMENTS

| | | |
|---|---|---|
| 2630234 | 10/1989 | France . |
| 2211970 | 7/1989 | United Kingdom . |
| 2217491 | 10/1989 | United Kingdom . |

*Primary Examiner*—Mark K. Zimmerman
*Attorney, Agent, or Firm*—Fitzpatrick, Cella, Harper & Scinto

[57] ABSTRACT

An output apparatus includes a storage device for storing font information; a unit for generating a predetermined pattern in accordance with the font information stored in the storage device; a unit for instructing to output a font list of the font information; and an output unit responsive to an instruction from the instructing unit for outputting a font list having a desired resolution.

6 Claims, 5 Drawing Sheets

OUTPUT APPARATUS PERMITTING FONT SELECTION BASED ON RESOLUTIONS

This application is a continuation of application Ser. No. 08/116,543, filed Sep. 7, 1993, now abandoned, which was a continuation of application Ser. No. 07/598,154, filed Oct. 16, 1990, now abandoned.

BACKGROUND OF THE INVENTION

1. Field of the Invention

The present invention relates to an image forming apparatus for forming images at a plurality of resolutions.

2. Related Background Art

Printers are known as apparatus for receiving data from an upper level apparatus (a host computer or the like) and forming images. Apparatus of this type include typeface printers, wiredot printers, ink jet printers, laser printers and the like, depending upon different mechanisms for forming images. Of these printers, a laser beam printer turns on and off a laser beam in synchronism with an image signal, causes the laser beam to scan in the horizontal direction by using a polygonal mirror, forms a latent image on a photosensitive drum, and forms an image by using electrophotography techniques.

Recently, there has been disclosed a technique wherein the rotation rate of a polygonal mirror is made variable to change the main scan resolution, and the transport speed of paper is made variable to change the sub-scan resolution.

A laser beam printer forms each character as a set of laser beam dots so that a character of a desired size and style can be printed out. For this reason, it is possible to down-load character patterns from an upper level apparatus, and use an external storage device, a detachable cartridge type character pattern supplying apparatus, or the like. An image forming apparatus has been proposed which outputs a font list in order for a user to understand which character pattern(s) (font) can be used.

A conventional font list is limited to those lists having a fixed resolution so that fonts cannot be output at a plurality of resolutions. In the case of scalable fonts, only a font list of fonts having a predetermined size can be printed out, and font lists having arbitrary sizes as desired by users are not allowed. If an apparatus can print out characters only at one resolution, there is no problem. However, if an apparatus can print out at a plurality of resolutions, there occurs the case where if fonts designed for a particular resolution are used at a different resolution, the resultant characters are properly formed.

SUMMARY OF THE INVENTION

It is therefore an object of the present invention to provide an output apparatus capable of outputting font list information suitable for a plurality of resolutions.

It is an aspect of the present invention to provide an output apparatus comprising: storage means for storing font information; means for generating a predetermined pattern in accordance with said font information stored in said storage means; means for instructing to output a font list of said font information; image forming means for outputting said pattern generated by said generating means at a plurality of resolutions; means for instructing to output a list of said font information; and output means responsive to an instruction from said instructing means for outputting a font list having a desired resolution.

It is therefore a further object of the present invention to provide an output apparatus capable of outputting such font list by changing the pattern size to the size corresponding to the resolution at the time of outputting such font list.

It is therefore another object of the present invention to provide an output apparatus comprising means for designating one font information from a plurality of sizes, such apparatus outputting said font list at the size designated by said designating means.

It is a still further object of the present invention to provide an output apparatus wherein, when a list of font information is instructed to be output, a predetermined pattern is generated in accordance with the stored font information, and the generated pattern is outputted to form an image and output a font list having a desired resolution.

BRIEF DESCRIPTION OF THE INVENTION

DETAILED DESCRIPTION OF THE PREFERRED EMBODIMENT

The preferred embodiment of this invention will be described with reference to the accompanying drawings.

<Description of Structure (FIGS. 1 and 2)>

Figure 1:
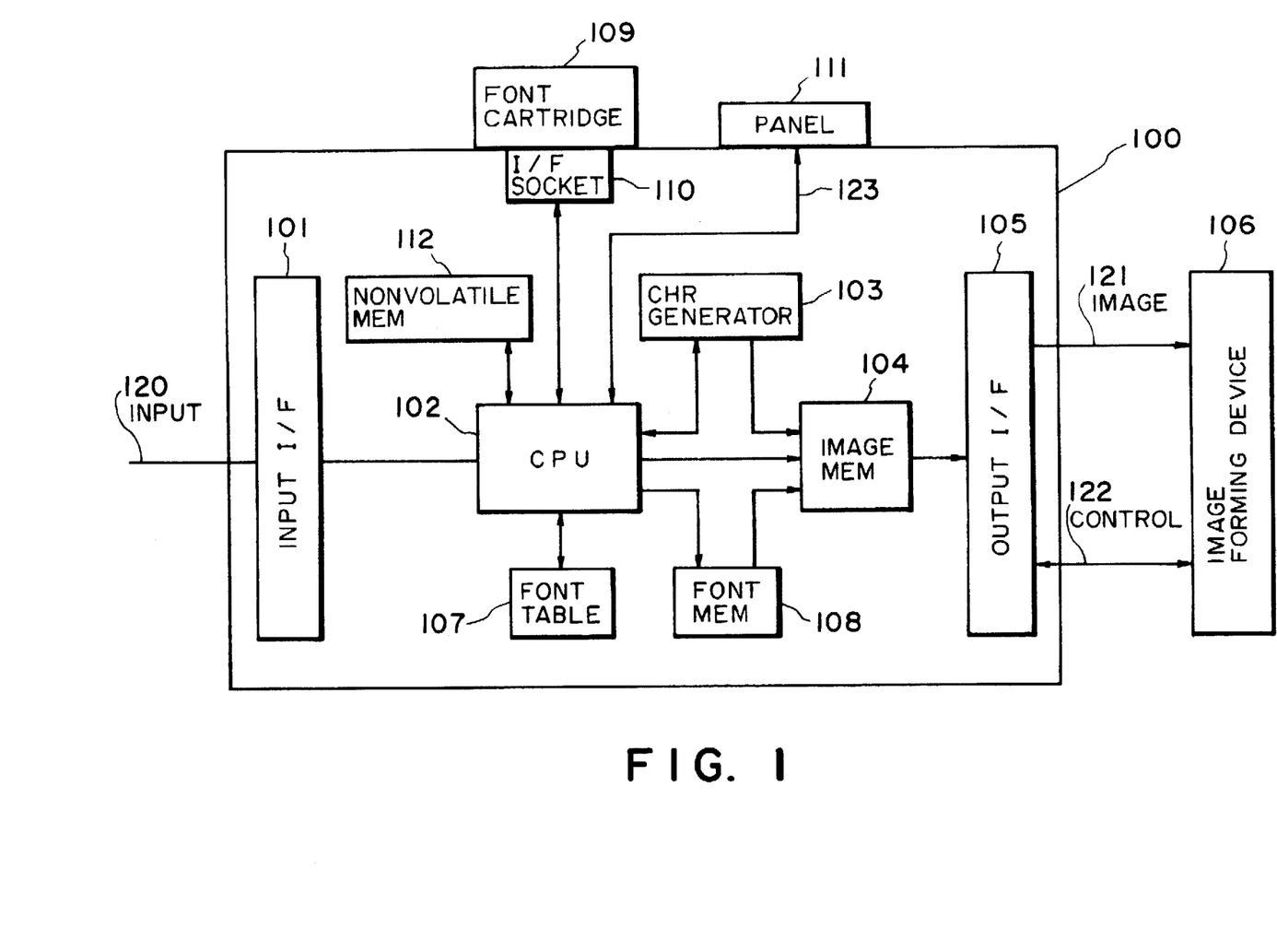
FIG. 1 is a block diagram showing the structure of an image forming apparatus according to the preferred embodiment of this invention.

FIG. 1 is a block diagram showing the outline of the structure of the image forming apparatus of an embodiment. In FIG. 1, reference numeral 100 represents a controller having a function of analyzing and converting an input signal 120 from an upper level apparatus (not shown) into an image signal 121, and a function of sending a control signal 122 to an image forming device 106 to notify the latter of a designated resolution. The image forming device 106 receives the control signal 122 and image signal 121 and forms an image having a designated resolution.

The controller 100 of this embodiment is constructed of an input interface 101 for receiving data, a CPU 102 for controlling procedures to be described later in accordance with programs included therein, a character generator 103 for generating a character in accordance with a designated character code and character size, an image memory 104 for temporarily storing a character pattern, image data and the like, an output interface 105 for reading an image from the image memory 104 and outputting the image signal 121 at the timing of an image clock corresponding to a designated resolution, a font table 107 for managing available fonts, a font memory 108 for registering fonts which are downloaded as the input data 120 from an upper level apparatus, an interface socket 110 for connection of a detachable font cartridge 109, a panel 111 for entering an operation command, and a re-writable and non-volatile memory 112 which holds the data even if power is turned off.

The resolution is set to a predetermined value when power is turned on. This resolution is being stored in the non-volatile memory 112 or the like which stores the data even if power is turned off.

The resolution is sent to the image forming device 106 via the output interface 105 in the form of the control signal 122 under the control of CPU 102. Upon reception of the control signal 122, the image forming device 106 sets the resolutions in the main and sub-scan directions.

If the preset resolution is to be changed, an operator enters an instruction signal 123 from the panel 111 to make CPU 102 change the resolution. Alternatively, the resolution may be changed in accordance with a resolution change control command sent from an upper level apparatus. Upon reception of the instruction signal 123 or the control command, CPU 102 instructs the image forming device 106 to change the resolution.

<Description of Font>

Two types of character fonts are generally known. One type is a dot font which is composed of a set of dots, a black dot being represented by "1" and a white dot by "0". The other type is a scalable font or a stroke font. For the scalable font, the contour of a character is stored in the form of straight lines and curves. For the stroke font, the contour of a character is stored in the form of skeletons and thickness information. Both dot fonts and scalable fonts have merits and demerits and are used in common in the same apparatus. Scalable fonts can generate characters of a desired size, but it takes time to develop a character. Dot fonts can generate characters in short time, but the size of a character is fixed. A dot font character changes its size when a resolution is changed. Assuming that one point is 1/72 inch, the relationship between the number of dots S, the resolution D, and the point size P is given by the following equation (1):

$$P = S/D \times 72 \qquad (1)$$

TABLE 1

| No. of DOTS | Point SIZE P | | |
|---|---|---|---|
| | 240 dpi | 300 dpi | 400 dpi |
| 24 | 7.2 | 5.8 | 4.3 |
| 30 | 9.0 | 7.2 | 5.4 |
| 32 | 9.6 | 7.7 | 5.8 |
| 40 | 12 | 9.6 | 7.2 |
| 50 | 15 | 12 | 9 |
| 67 | 20 | 16 | 12 |

In Table 1, there are shown point sizes for the numbers of dots frequently used at respective resolutions 240 dpi, 300 dpi, and 400 dpi (dpi=dot/inch). The term "point" is generally used in the art of this field as a unit indicative of the size of a character.

The point size changes with the resolution even if the same number of dots is used. Therefore, it is necessary to consider the resolution when a font list is output.

<Font Management Table (FIG. 2)>

Figure 2:
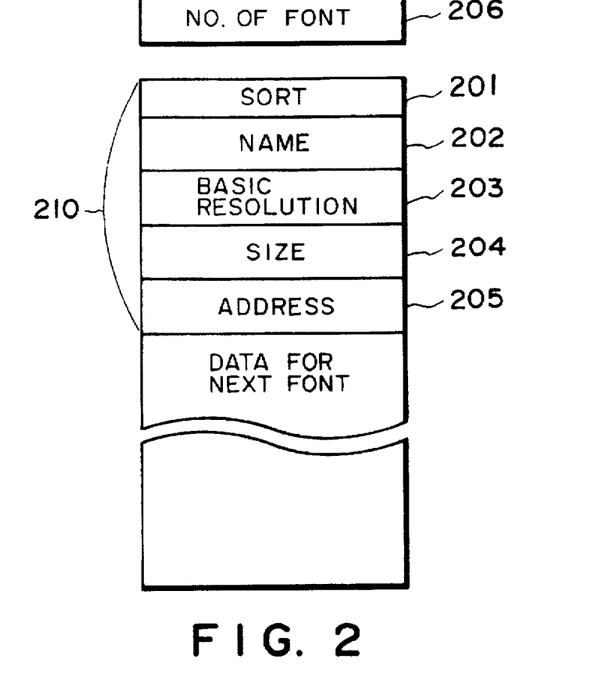
FIG. 2 shows the contents of the font management table of that embodiment.

The font mangement table 107 storing a list of available fonts is shown in FIG. 2. This font management table 107 is generated or updated when power is turned on or fonts are down-loaded.

As shown in FIG. 2, in the font management table 107 there are provided an area 201 for setting a sort data which discriminates between a dot font and scalable font, and between built-in font, font from font cartridge, and down-loaded font, an area 202 for setting a font name represented by character codes, an area 203 for storing a basic resolution of a dot font character, an area 203 for setting the dot number (size) of a dot font character, and an area 205 for setting the actual address of a font. Font information of each font character is stored in an area 210. The number of fonts in the table 107 is stored in an area 206 and incremented by 1 each time the font information of a font character is stored.

For example, at the basic resolution of 240 dpi in Table 1, the dot numbers "24", "32", and "40" are used frequently. If the resolution is changed to 300 dpi, the corresponding dot numbers become "30", "40", and "50". Thus, the size of a character changes with the resolution. In the case of a character having a large possibility of being used at three resolutions, such as a character having a dot number of "40", dots are designed to have a slightly larger thickness for 240 dpi resolution since they will become a little bit larger, whereas spaces between dots are designed to be larger for 400 dpi resolution since they will become smaller and thus have superposition therebetween. In this manner, characters are developed in accordance with resolutions.

<Forming Management Table (FIGS. 3 and 4)>

Figure 3:
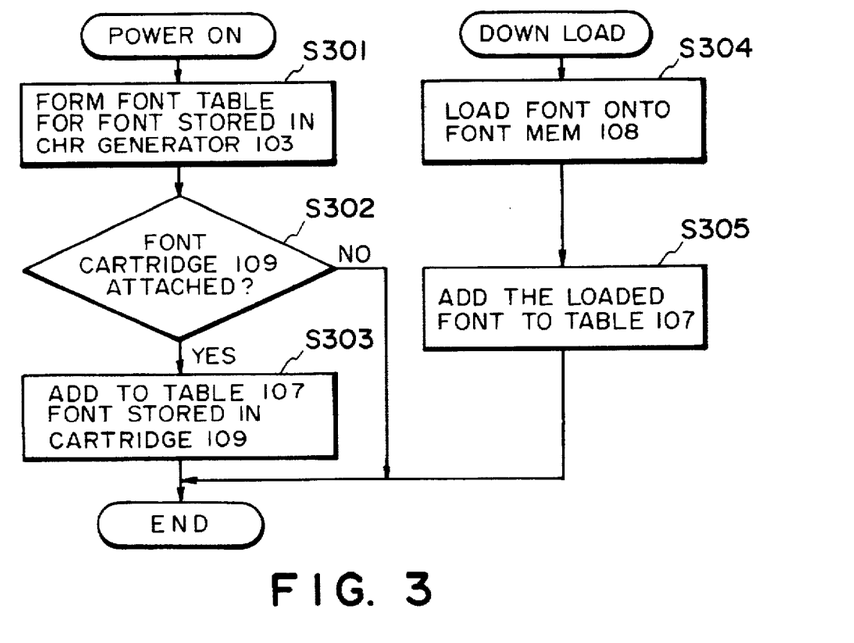
FIG. 3 is a flow chart illustrating the procedure of forming the font management table of that embodiment.

FIG. 3 is a flow chart illustrating the procedure of forming the font management table 107.

The procedure starts at step S301 when power is turned on. At step S301, the informance of fonts stored in the character generator 103 are stored in the font management table 107. At step S302, it is checked if the font cartridge 109 is connected to the socket 110. If not, the procedure terminates. If connected, the information of the fonts stored in the font cartridge 109 are added to the font management table 107 at step S303.

If fonts are down-loaded via the input interface 101, CPU 102 controls the procedure to start at step S304 whereat the fonts are stored in the font memory 108. Next, at step S305 the down-loaded fonts are added to the font management table 107 in a similar manner to the above-described built-in fonts.

Figure 4:
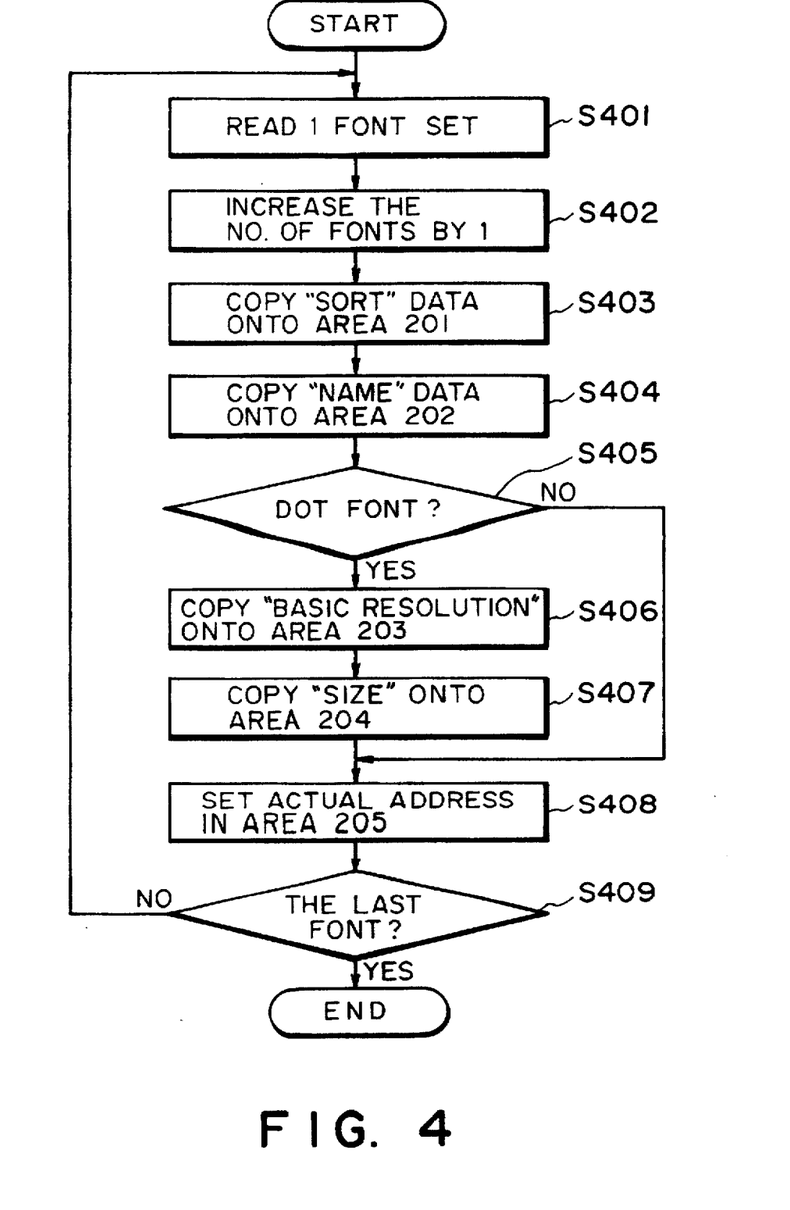
FIG. 4 is a flow chart illustrating the detailed procedure of forming the font management table of that embodiment.

The font management table forming routine at steps S301, S303, and S305 is described in detail with reference to the flow chart shown in FIG. 4.

In this routine, the address at which a font is actually present is called as a parameter. For example, at step S301, the font address of the non-volatile memory 112 is used as a parameter.

At step S401, by using a set address, the font information such as indicated at 210 in FIG. 2 is read. Next, at step S402, the number of fonts in the area 206 of the font management table 107 is incremented by 1. In accordance with the incremented number, there is obtained the area in which the font information is set. At step S403 the sort data of the font information is copied onto the sort code area 201. At step S404 the font name is copied onto the font name area 202.

Next, at step S405 it is checked from the sort data if the font is a dot font. If not, the control advances to step S408. If it is a dot font, the control advances to step S406, where the basic resolution is copied onto the basic resolution area 203. At the next step S407, the dot size is copied onto the dot size area 204.

After the above procedure, the actual font address is set in the address area 205 at step S408 to complete the information setting procedure for one font. At step S409, it is checked if the font is the last one. If not, the control returns to step S401 to repeat the above procedure.

After forming of the font management table 107 in the manner described above, it becomes possible to output a font list which will be described later.

<Printing Font List (FIGS. 5 and 6)>

Next, the procedure of printing a font list of the font management table 107 will be described with reference to the flow chart shown in FIG. 5.

Figure 5:
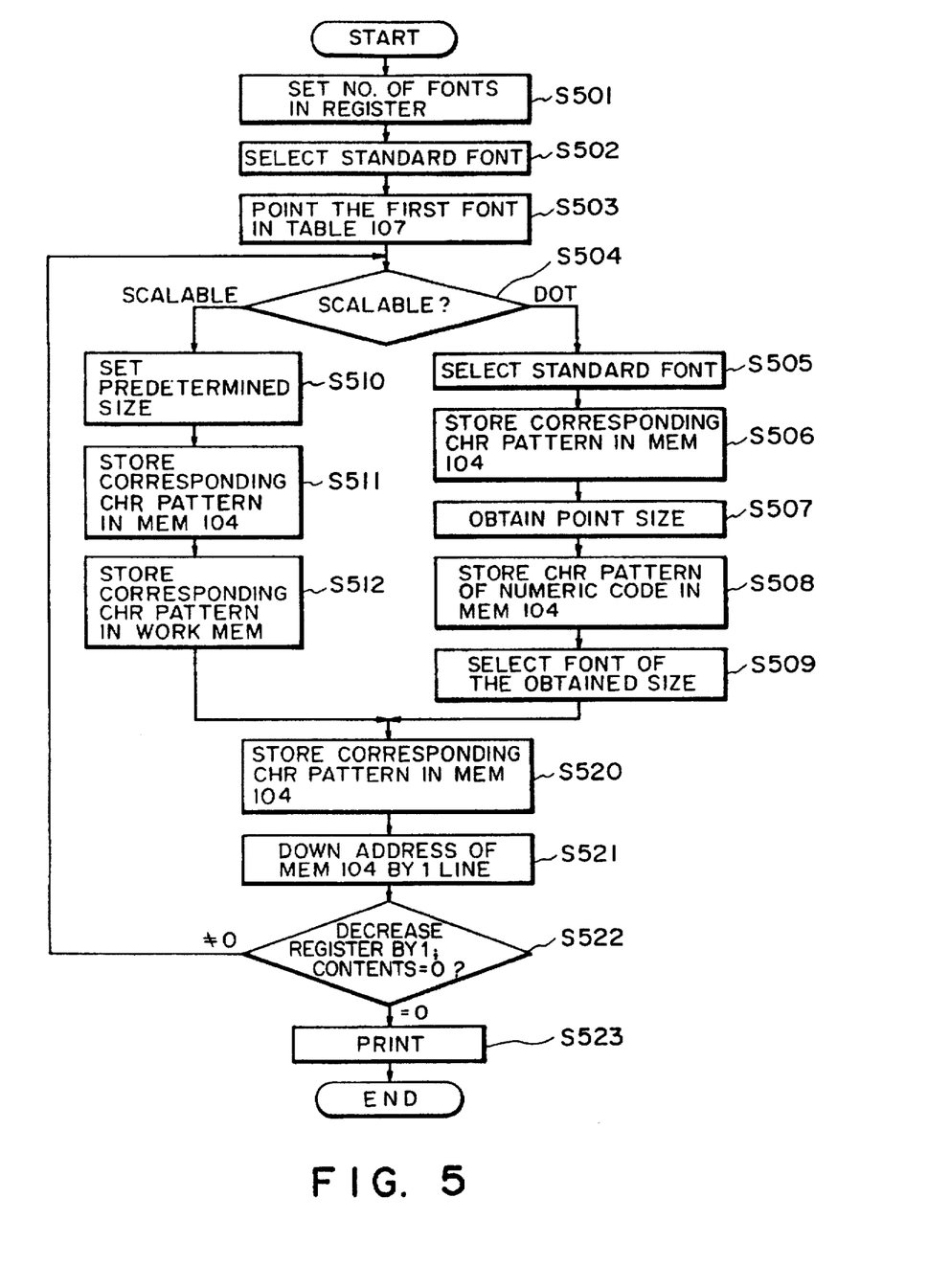
FIG. 5 is a flow chart illustrating the procedure of outputting a font list of that embodiment.

In this embodiment, when a font list switch on the panel 111 is depressed, the procedure illustrated in FIG. 5 starts.

Figure 6:
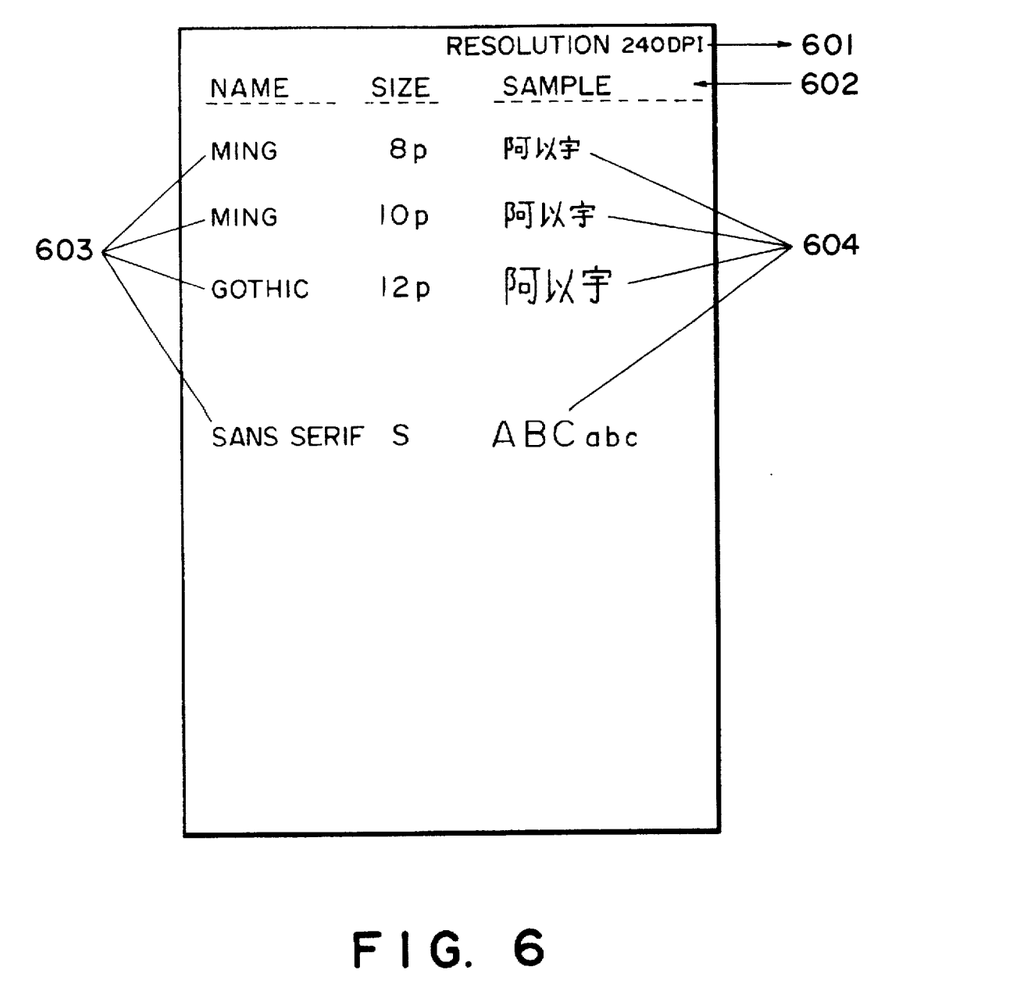
FIG. 6 shows an example of the font list.

Upon completion of this procedure, a clear and distinctive font list such as shown in FIG. 6 is printed out. The size of the printed-out font list matches the resolution used at that time.

Sample characters are printed out in their particular sizes, but characters used for the name, size, and the like are printed out with predetermined standard fonts. Scalable fonts are printed out in the size stored in the non-volatile memory 112. This size can be changed by entering a change instruction from the panel 112.

At step S501 the number of fonts in the font management table 107 is set in a register. At the next step S502, standard fonts are selected, and the character patterns for the resolution 601 and items 602 shown in FIG. 6 are developed via the character generator 103 into the image memory 104 at predetermined addresses. The next position to the developed area is designated. At step S503 the first font in the font management table 107 is pointed out.

Next, at step S504 the sort code is checked to see if the font is a scalable font or a dot font. In the case of a dot font, the control advances to step S505 whereat standard fonts are selected again. At step S506, the font name is read so that a character pattern corresponding to the font name is developed via the character generator 103 into the image memory 104, and thereafter the address is incremented. At step S507, the size is read and the equation (1) is solved to obtain the point size. At step S508 the character pattern corresponding to the obtained point number code is written in the image memory 104.

After writing the character pattern, the control advances to step S509 whereat fonts of the obtained size are selected. At step S520 character patterns corresponding to sample character train codes (predetermined train codes) are written via the character generator 103 into the image memory 104.

At the next step S521, the address of the image memory is decreased downward by one line to move to the top of the next line. At the next step S522 the contents of the register are reduced by 1 to thereafter point the next font information. If the contents of the register are not "0", the control returns to step S504 to repeat the character pattern development procedure.

If the font is a scalable font at step S504, the control advances to step S510, where the size stored in the non-volatile memory 112 is set. At the next step S511 the font name is read from the table 107. A dot pattern corresponding to a character code and having the size set for the scalable font is generated by the character generator 103 and written in the image memory 104.

At step S512 a sample character pattern having the size set at step S510 is generated by the character generator 103 and developed in a dot pattern in the work memory. At step S520 the dot pattern is written in the image memory 104.

At step S523 after writing the last font in the above manner, dot patterns developed in the image memory 104 are outputted via the output interface 105 to the image forming device 106 and printed out.

As described so far, in an image forming apparatus capable of forming images at a plurality of resolutions as in this embodiment, it is possible to print a font list having a proper size at each resolution, thereby avoiding selection of an erroneous character from the upper level apparatus.

In printing out a font list of scalable fonts, it is possible to print fonts of desired sizes. In printing out a font list of dot fonts, it is possible to use only those fonts designed for a particular resolution and print out a font list.

In the above embodiment, fonts can be used at any resolution. Instead, if dot fonts having a basic resolution suitable for the present resolution only are allowed to be used, the basic resolution only is referred to. In printing out a font list of fonts at only such a resolution, the following step is inserted before step S505.

In this step, the present resolution is compared with a basic resolution in the management table 107. If the resolution is the same, the following steps are executed. If not, the control advances to step 522 to move to the next font information. With this processes, although other resolutions cannot be used, a most beautiful font can be selected.

Furthermore, the size of a scalable font is set from the panel in this embodiment. Instead, the size may be set in accordance with input data from an upper level apparatus. The size may also be set by using switches such as a dual-in-line switch and the like.

As appreciated from the foregoing description of this invention, it is possible to print out a font list of fonts at a plurality of resolutions. The resolution and character style may be designated in order to print out a font list of only those fonts having a desired character style.

I claim:

1. An output control apparatus comprising:
   setting means for setting a resolution;
   read means for sequentially reading font information stored in a font management table for a plurality of fonts;
   discrimination means for discriminating whether a font is a scalable font or a dot font, in response to the font information read by said read means;
   generation means for generating a character pattern of a predetermined size based on scalable font data if said discrimination means discriminates that the font is a scalable font;
   calculation means for calculating a point size in response to the resolution set by said setting means and the font information read by said read means if said discrimination means discriminates that the font is a dot font; and
   development means for developing, in the resolution set by said setting means, a list of scalable fonts including a font name, information indicating that the font is a scalable font, and the character pattern generated by said generation means and a list of dot fonts including a font name, the point size calculated by said calculation means, and a character pattern corresponding to the font information read by said read means.

2. An apparatus according to claim 1, further comprising designation means for designating the predetermined size.

3. An apparatus according to claim 1, further comprising print means, with a variable resolution, for printing the font list developed by said development means in the resolution set by said setting means.

4. An output control method comprising the steps of:
   setting a resolution;
   reading sequentially font information stored in a font management table for a plurality of fonts;
   discriminating whether a font is a scalable font or a dot font, in response to the font information read by said reading step;
   generating a character pattern of a predetermined size based on scalable font data if said discriminating step discriminates that the font is a scalable font;
   calculating a point size in response to the resolution set by said setting step and the font information read by said reading step if said discriminating step discriminates that the font is a dot font; and developing, in the resolution set by said setting step, a list of scalable fonts including a font name, information indicating that the font is a scalable font, and the character pattern generated by said generating step and a list of dot fonts including a font name, the point size calculated by said calculating step, and a character pattern corresponding to the font information read by said reading step.

5. A method according to claim 4, further comprising the step of designating the predetermined size.

6. A method according to claim 4, further comprising the step of printing, with a variable resolution, the font list developed by said developing step in the resolution set by said setting step.

* * * * *

UNITED STATES PATENT AND TRADEMARK OFFICE
CERTIFICATE OF CORRECTION

PATENT NO. : 5,740,462

DATED : April 14, 1998

INVENTOR(S) : MASARU IGARASHI

It is certified that error appears in the above-identified patent and that said Letters Patent is hereby corrected as shown below:

On the title page:
AT [56] REFERENCES CITED - U.S. PATENTS DOCUMENTS

"Martwez" should read --Martinez--.

COLUMN 1

Line 48, "properly" should read --improperly--.

COLUMN 2

Line 5, "such" should read --said--.
Line 6, "said" should read --such--; and
Line 12, "outputted" should read --output--.

COLUMN 3

Line 26, "in short" should read --in a short--.

COLUMN 4

Line 20, "informance" should read --information--.

COLUMN 6

Line 9, "processes," should read --process,--.

Signed and Sealed this

Twenty-ninth Day of December, 1998

Attest:

BRUCE LEHMAN

*Attesting Officer*  *Commissioner of Patents and Trademarks*